No. 801,895. PATENTED OCT. 17, 1905.
T. J. MURPHY.
JUNCTION BOX.
APPLICATION FILED SEPT. 12, 1902.
5 SHEETS—SHEET 1.
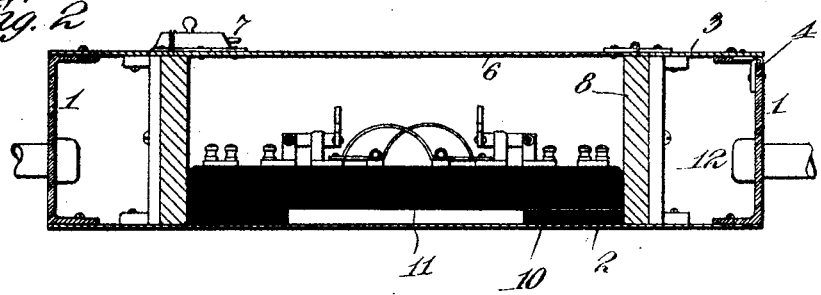
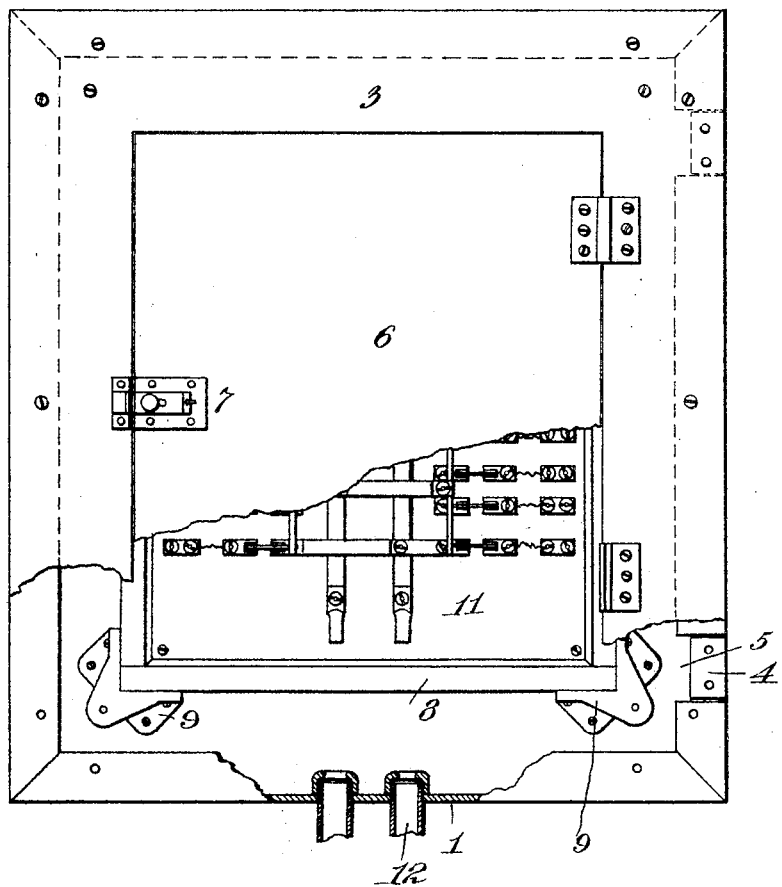
Witnesses:
Inventor
Thomas J. Murphy.
Attorneys

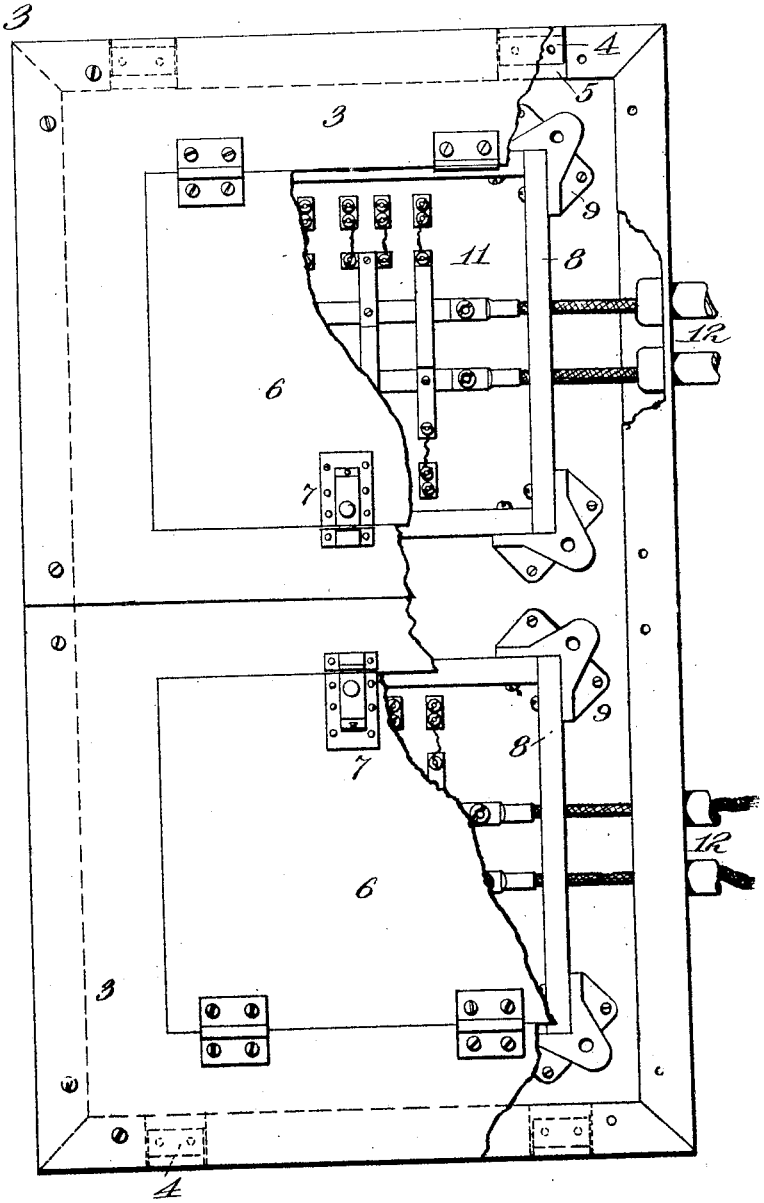

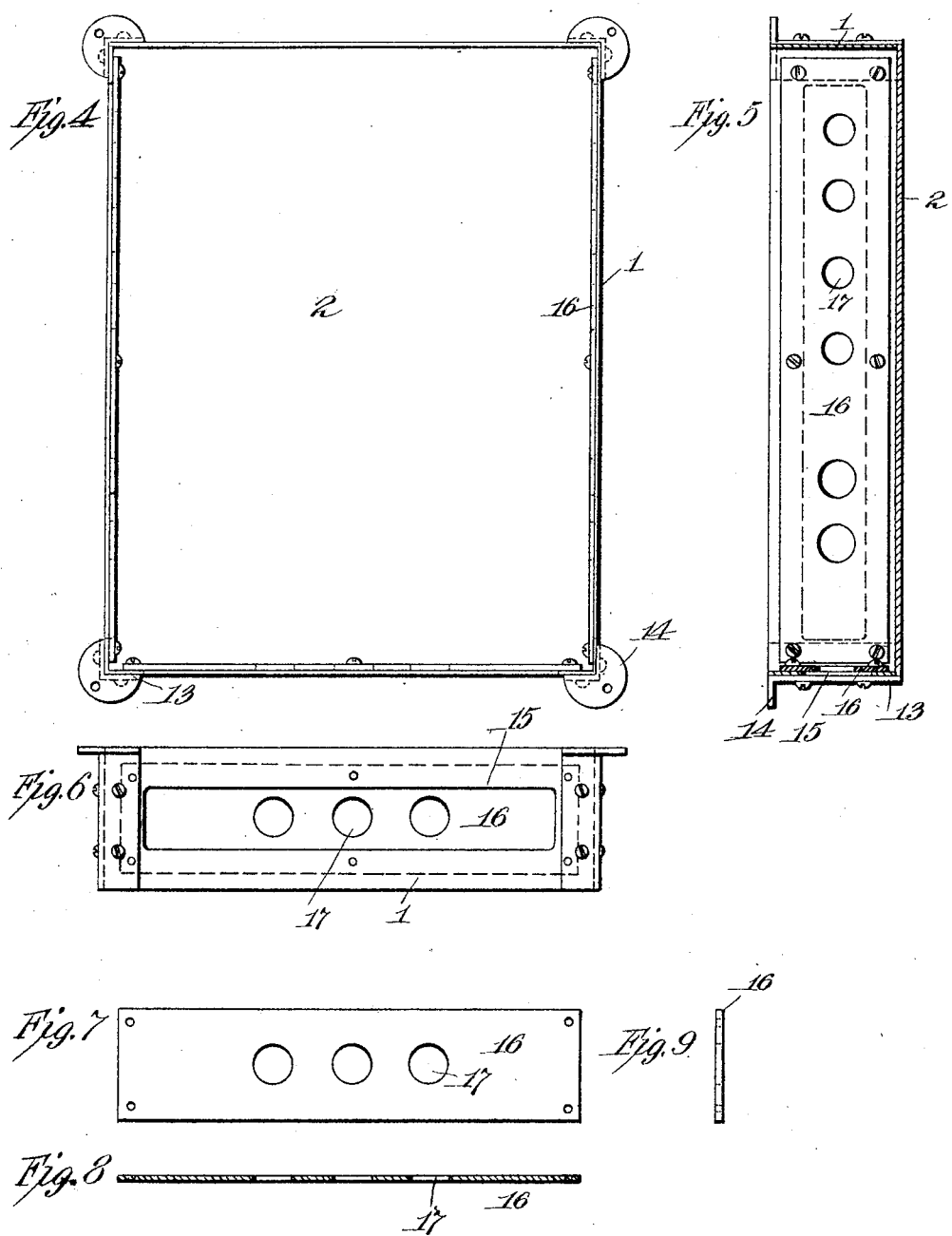

No. 801,895. PATENTED OCT. 17, 1905.
T. J. MURPHY.
JUNCTION BOX.
APPLICATION FILED SEPT. 12, 1902.
5 SHEETS—SHEET 4.
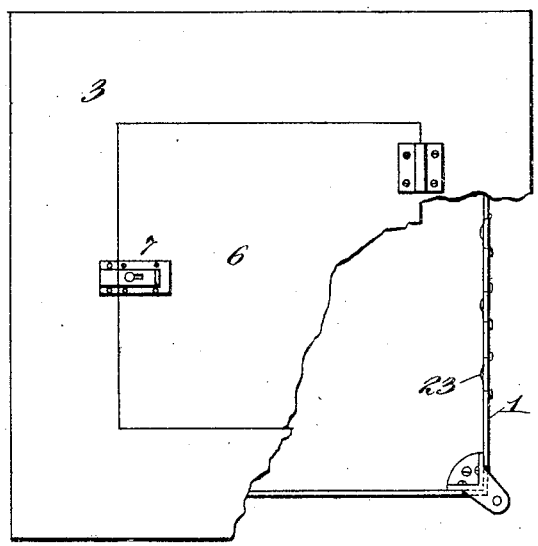
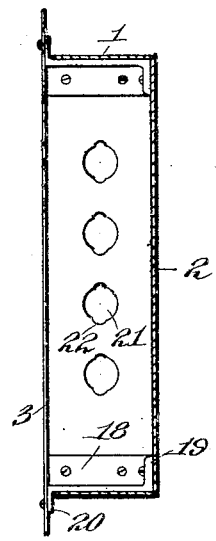
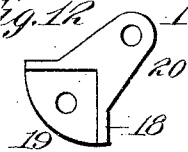
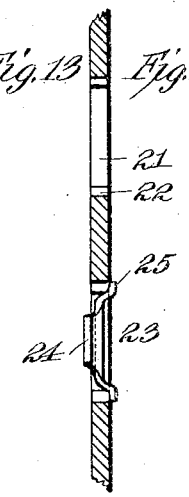
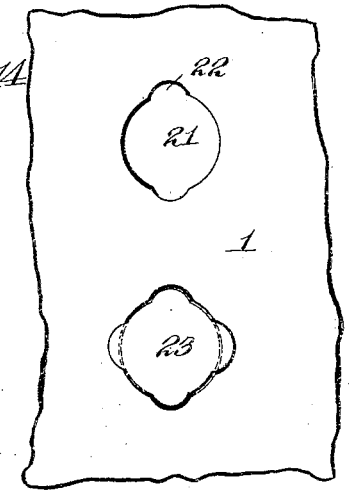
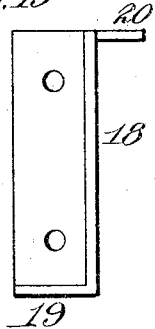
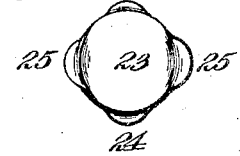
Witnesses:
John Louis Lotsch
Jno. Robt Taylor
Inventor
Thomas J. Murphy
by Dyer Edmonds & Dyer
Attorneys No. 801,895. PATENTED OCT. 17, 1905.
T. J. MURPHY.
JUNCTION BOX.
APPLICATION FILED SEPT. 12, 1902.

5 SHEETS—SHEET 5.

Witnesses:
John Louis Lotsch
Jno. Robt Taylor

Inventor
Thomas J. Murphy
by Dyer Edmonds & Dyer
Attorneys

UNITED STATES PATENT OFFICE.

THOMAS J. MURPHY, OF NEW YORK, N. Y.

JUNCTION-BOX.

No. 801,895.  Specification of Letters Patent.  Patented Oct. 17, 1905.

Application filed September 12, 1902. Serial No. 123,107.

*To all whom it may concern:*

Be it known that I, THOMAS J. MURPHY, a citizen of the United States, residing in the borough of Manhattan, city of New York, State of New York, have invented a certain new and useful Improvement in Junction-Boxes, of which the following is a description.

My invention relates to improvements in junction-boxes; and my object is to provide a new and useful box for the purpose which shall be superior in construction to those now used and capable of being economically made in different sizes for special locations.

My improved junction-box is made of sheet metal with separate sides, ends, top, and bottom, so that by merely varying the dimensions of these elements boxes of different sizes can be produced. The invention not only relates, broadly, to a junction-box made of sheet metal, but also to improvements in details of construction, and especially in regard to the manner of securing together the elements constituting the outer inclosing casing.

In order that the invention may be better understood, attention is directed to the accompanying drawings, forming part of this specification, and in which—

Figure 18:
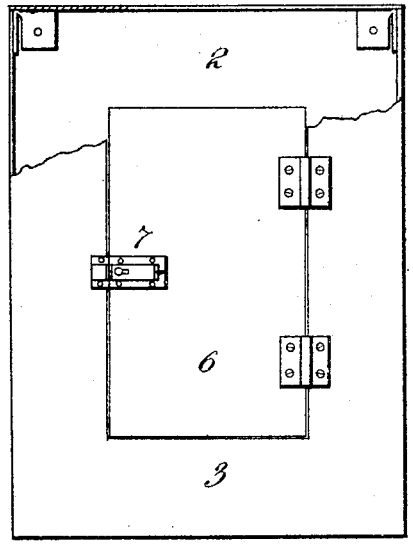
Figure 19:
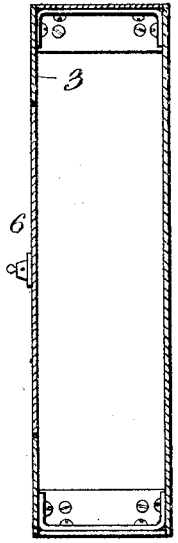
Figure 20:
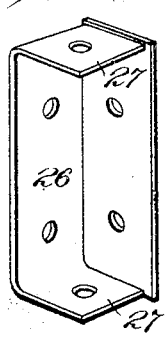

Figure 1 is an elevation, partly in section, showing a simple box of the preferred form; Fig. 2, a cross-sectional view of the same; Fig. 3, an elevation, partly in section, illustrating a double box of the form shown in Figs. 1 and 2; Fig. 4, an elevation of the outer casing of the junction-box with the top removed, showing a different manner of securing the sides and ends together; Fig. 5, a cross-sectional view of the same; Fig. 6, an end view; Fig. 7, a separate plan of one of the removable plates for carrying the nipples for the leading-in wires; Fig. 8, a section view of said plate; Fig. 9, an end view thereof; Fig. 10, an elevation, partly in section, of the outer casing of the box, illustrating another manner of securing the sides and ends together; Fig. 11, a vertical sectional view of the same; Fig. 12, a separate plan view of the corner-bracket shown in Figs. 10 and 11; Fig. 13, a sectional view, on an enlarged scale, showing a portion of one of the sides and illustrating particularly the construction of the removable plug for closing the nipple-openings; Fig. 14, a plan view of the part shown in Fig. 13; Fig. 15, an elevation of the bracket shown in Fig. 12; Fig. 16, an elevation of one of the removable plugs shown in Figs. 13 and 14; Fig. 17, a sectional view of said plug; Fig. 18, a plan view, partly in section, illustrating another manner of securing the sides and ends of the casing together; Fig. 19, a vertical sectional view of the same; Fig. 20, a separate perspective view of one of the wrought-metal corner-brackets shown in Figs. 18 and 19; Figs. 21, 22, 23, and 24, separate detail sectional views showing different methods of securing the sides and ends of the outer casing together; and Figs. 25, 26, 27, and 28, enlarged sectional views of the nipples shown in Figs. 21, 22, 23, and 24, respectively.

In all of the above views corresponding parts are represented by the same numerals of reference.

Referring to Figs. 1 and 2, the outer casing is provided with sheet-metal side and end walls 1, with a sheet-metal bottom 2 and with a sheet-metal top 3. These elements may obviously be made of different dimensions in order to produce boxes of different sizes. As shown, the members 1 are in the form of channel-irons, to the flanges of which the bottom and top are screwed or bolted. Preferably the top 3 is also connected to one of the side members by a hinge 4, for which purpose the upper flange of said side member is cut away at 5, (see Fig. 1,) so that by removing the screws which hold the top 3 in position the top may be swung outwardly, so as to disclose the interior of the casing, as will be understood. The top 3 is provided with a hinged door 6, having a latch 7, so that said door may be swung outwardly to disclose the electric connections. Mounted within the casing 1 is the interior box 8, made of slate or of any other suitable material, such as wood impregnated with an insulating composition. This interior box is of any suitable construction, and its side and end members may be connected together by corner-brackets 9, as is common in the art. Mounted within the interior box on insulating-blocks 10 is the slate base 11, which carries the terminal switches and fuses, as is common. Leading into the outer casing are nipples 12, through which pass the leading-in wires and which are of any suitable construction.

Fig. 3 illustrates a casing containing two inner boxes 8 and having two hinged tops 3, as will be understood. This construction, it will be seen, is identical with that shown in Fig. 1, except that the side members are elongated to accommodate the two top plates 3.

In Fig. 4 the side and end members 1 are of sheet metal screwed or bolted to angular brackets 13, provided with lugs 14, to which the top member of the casing may be bolted. One or more of the side or end members may be provided with a slot 15, cut therein, which slot is covered by a plate 16. (See Figs. 7, 8, and 9.) This plate is provided with openings 17 for the reception of nipples for receiving the leading-in wires. By means of this construction it is only necessary to remove one or more of the plates 16 and to replace them with new plates when a different number of leading-in wires are to be connected with the box.

In Figs. 10 and 11 the construction is substantially the same as that just described, except that the side and end members 1 are secured on the outside of angular brackets 18, formed with a lug 19 at the bottom, to which the bottom 2 of the casing may be screwed, and with a lug 20 at the top, to which the top 3 may be secured. The construction of these brackets is fully illustrated in Figs. 12 and 13.

In Figs. 11, 13, 14, 16, and 17 I also illustrate improvements in removable plugs for closing one or more of the openings formed in the side or end members of the casing for normally receiving the nipples for the leading-in wires when a removable plate, such as I show in Figs. 5 to 9, inclusive, is not employed. Referring particularly to Figs. 13, 14, 16, and 17, it will be seen that the side or end members of the casing are formed with openings 21, having diametric offset portions 22 therein. The plug 23 is made of sheet metal struck up into shape, as shown, and having lugs 24, which can pass through the extensions 22, and with other lugs 25, which are too large for that purpose. In applying one of the plugs in position it is only necessary to pass the lugs 24 through the extensions 22, pressing the plug firmly in position and rotating it a quarter of a turn, so as to effectively conceal the opening and hold the plug securely in place.

In Figs. 18, 19, and 20 the side and end members are secured together by means of sheet-iron brackets 26, bent to the shape shown in Fig. 20 and with overturned top and bottom members 27, to which the bottom and top of the casing may be secured. It will be obvious that the side and end members 1 of the casing are bolted or screwed to the angular vertical members of these brackets.

Figure 21:
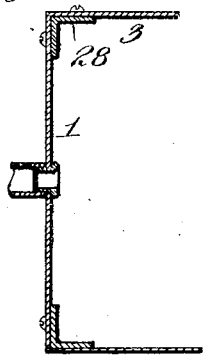

In Fig. 21 the side and end members 1 are secured together by means of ordinary angle-irons 28 instead of by special brackets, as shown in Figs. 10 and 11.

Figure 22:
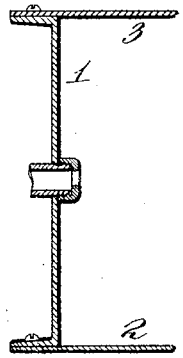

In Fig. 22 I illustrate a construction substantially identical with that of Figs. 1 and 2, except that the side and end members 1 are formed of channel-irons the flanges of which extend outwardly.

Figure 23:
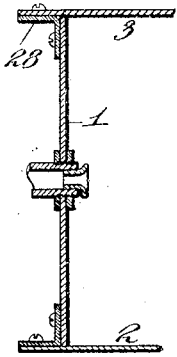

In Fig. 23 a construction similar to Fig. 21 is shown, except that the angle-iron brackets 28 are arranged on the outside of the side and end members instead of on the inside thereof.

Figure 24:
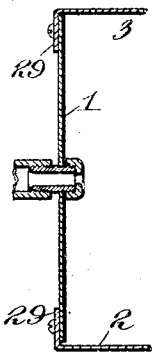
Figure 25:
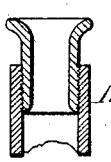
Figure 26:
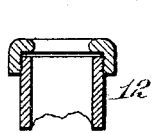
Figure 27:
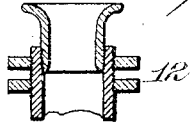
Figure 28:
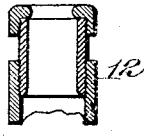

In Fig. 24 the side and end members 1 are secured to the top and bottom members by providing said top and bottom members with overturned flanges 29, to which the side and end members are screwed or bolted.

Referring to Figs. 25 to 28, inclusive, the construction of nipples for receiving the leading-in wires and which I illustrate in these figures will be obvious.

Having now described my invention, what I claim as new, and desire to secure by Letters Patent, is as follows:

1. In junction-boxes, the combination with a casing having side and end members made of sheet metal and corner-brackets to which said side and end members are secured, of an insulating interior box within the casing, substantially as set forth.

2. As a new article of manufacture, a casing for a junction-box, having side and end members made of sheet metal with corner-brackets to which said side and end members are secured, a top member hinged to one of the side members and removably attached to the other side and end members, and a hinged door in the top member, substantially as set forth.

3. In junction-boxes, the combination with a casing the side and end members of which are made of sheet metal, of a top member hinged to one of the side members and removably attached to the other side and end members, and an interior box within the case, said box being formed of insulating material and a hinged door in the top member, the said door being of substantially the size of the interior box, substantially as set forth.

4. As a new article of manufacture, a casing for a junction-box having side and end members made of sheet metal and connected together, one of said members being provided with a longitudinal opening therein, and a separate closing-plate secured over said opening and provided with one or more nipple-openings, substantially as and for the purposes set forth.

This specification signed and witnessed this 1st day of August, 1902.

THOMAS J. MURPHY

Witnesses:
   JNO. ROBT. TAYLOR,
   JOHN LOUIS LOTSCH.